G. W. THOMAS.
ROLLER BEARING.
APPLICATION FILED FEB. 5, 1916.
1,236,017.
Patented Aug. 7, 1917.
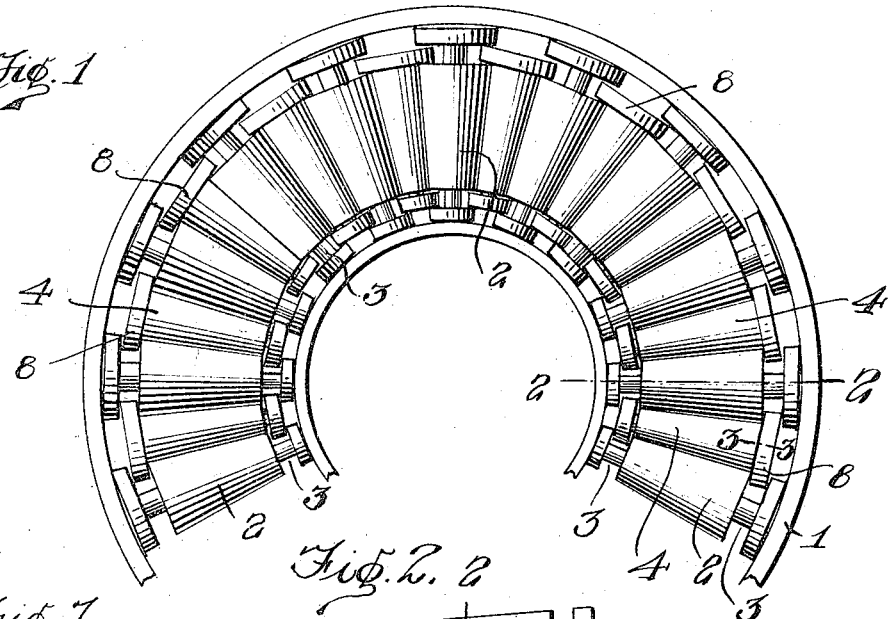
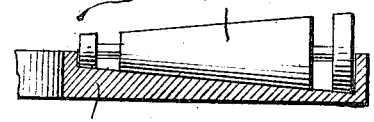
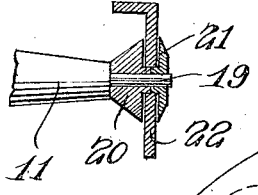
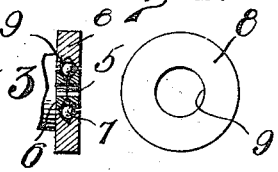
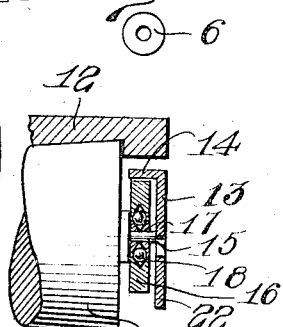
INVENTOR
George W Thomas
BY
ATTORNEY
WITNESSES

UNITED STATES PATENT OFFICE.

GEORGE W. THOMAS, OF RED OAK, IOWA.

ROLLER-BEARING.

1,236,017.  Specification of Letters Patent.  Patented Aug. 7, 1917.

Application filed February 5, 1916. Serial No. 76,454.

*To all whom it may concern:*

Be it known that I, GEORGE W. THOMAS, a citizen of the United States, residing at Red Oak, in the county of Montgomery and State of Iowa, have invented certain new and useful Improvements in Roller-Bearings, of which the following is a specification.

This invention relates to roller bearings. The principal object of the invention is to provide a roller bearing wherein all friction due to rubbing contact between the rollers is avoided.

The invention consists in the provision of bearing rollers which are held in a desired relative position by means of spacing rollers.

It is another object of the invention therefore, to provide means to eliminate rubbing contacts between the bearing rollers and spacing rollers, and to provide anti-friction means for supporting the spacing rollers.

Another object of the invention is to provide means to retain the parts of the bearing in assembled relation.

A further object of the invention is to provide means to eliminate rubbing contacts between the rollers and the retaining means.

With the foregoing and other objects in view, the invention consists in the novel features of construction, combination and arrangement of parts as will be hereinafter more fully described, illustrated in the accompanying drawings, and claimed.

In the drawings:

Figure 1 is a plan view of an end thrust roller bearing constructed in accordance with the invention.

Fig. 2 is a section on the line 2—2 of Fig. 1.

Fig. 3 is a detail section on the line 3—3 of Fig. 1.

Fig. 4 is an end view of one of the anti-friction supports for the spacing rollers.

Fig. 5 is an end view of one of the cone washers.

Fig. 6 is an end view of a radial type of bearing constructed in accordance with the invention.

Fig. 7 is a section on the line 7—7 of Fig. 6; and

Fig. 8 is a section on the line 8—8 of Fig. 6.

Referring to the drawings by numerals, wherein is illustrated the preferred embodiment of my invention, 1 designates a support or housing for the bearing which, as is most clearly illustrated in Fig. 2 of the drawings, is of substantially U-shape in cross section. This housing is circular in shape so that when a plurality of bearing rollers are arranged therein, an end thrust bearing will be provided.

A plurality of tapered bearing rollers 2 are provided which are adapted to be arranged within the housing in spaced relation. Each of these rollers adjacent both ends, is provided with a groove 3, the purpose of which will presently appear. The upper face of the housing is beveled or cut at an angle from its outer edge toward its inner so that the beveled rollers will contact therewith throughout their longitudinal extent, the rollers being prevented from longitudinal movement relative to the housing by reason of their ends engaging with the arms formed by recessing the housing to form it into U-shape.

In order to hold the bearing rollers 2 in spaced relation, I provide a plurality of spacing rollers 4 which are adapted to be arranged between the bearing rollers. These spacing rollers are relatively shorter than the bearing rollers 2 and are of a smaller diameter than the bearing rollers so that the shaft or other object supported by the bearing rollers will not engage therewith. A spindle 5 is formed on either end of each of the spacing rollers and these spindles are adapted to have mounted thereon and secured thereto in any suitable manner, a pair of cone washers 6, the beveled faces thereof being arranged in facing relation so that a race is provided for a plurality of anti-friction balls 7. A disk 8 is provided which has an opening 9 formed centrally therein, the wall of the disk at the opening being channeled or formed into substantially V-shape so as to provide a race way to co-act with the race way of the washers to receive and retain the anti-friction balls 7. These disks 8 are adapted to ride in the grooves 3 of the bearing rollers 2 so that the spacing rollers will be held against longitudinal movement relatively to the bearing rollers, the disks 8 being larger than the spacing rollers so that their outer edges will engage in the grooves and abut with the walls of the bearing rollers to prevent their longitudinal movement and also hold the same in spaced relation from the angular wall of the housing.

By the construction as just described, rotation of a shaft or other object in engagement with the bearing rollers 2 will cause the rollers to be rotated and to travel around the housing. Thus no sliding movement of the rollers will be obtained and consequently all friction overcome. By the provision of the disks 8 and the anti-friction connection between these disks and the spacing rollers, the said spacing rollers will be permitted to roll with the bearing rollers without any sliding contact between the disks and the housing or between the spacing rollers and the disks.

In Fig. 6 of the drawings, I have shown the construction as described in connection with an end thrust bearing as being adapted for a radial bearing. The bearing rollers 10 are adapted to be held in spaced relation by means of spacing rollers 11. A housing 12 is provided which has its inner face recessed to snugly receive the beveled or tapered walls of the bearing roller, as is usual. A retaining ring 13 is provided which is of substantially L-shape in cross section, the inwardly extending flange 14 thereof being formed on its outer edge. Spindles 15 are formed on either end of the bearing rollers upon which are arranged disks 16 which are rotatable relatively to the bearing rollers and are supported on the spindles by means of cone washers 17 carrying the anti-friction balls 18. The construction of these disks is similar to that described in connection with the disks for supporting the spacing rollers illustrated in Fig. 1 of the drawings. These disks, however, instead of engaging with the housing as is the case in the end thrust type of bearing are adapted for engagement with the inwardly extending flanges of the retaining rings. It is to be understood that both ends of the rollers are of the same construction so that the pair of retaining rings serve to hold the rollers against accidental displacement when the bearing is removed, the disks 16 providing means for engagement with the retaining rings to prevent movement of the bearing rollers relatively thereto and to obviate any sliding contacts between the bearing rollers and their retaining means.

The spacing rollers 11 are provided at either end with spindles 19 which have mounted thereon a pair of washers 20. These washers are provided with centrally arranged bosses 21 which are adapted to be arranged in abutting relation so that a groove is formed to receive the inner edge of the retaining ring 13. Thus, a rolling contact is provided between the spacing rollers and the bearing ring and sliding contacts are avoided. A second retaining ring 22 has also been provided which is adapted to be arranged in spaced relation with the ring 13 so as to also be received in the groove provided by the washers 20. The several bearing rollers and spacing rollers therefore are thus held in a desired relative position.

It is thought from the foregoing description taken in connection with the accompanying drawings, the construction and operation of the improved roller bearing will be clearly understood. However, I desire it to be understood that straight rollers instead of tapered rollers may be supported and arranged in a manner similar to that I have described in connection with the tapered rollers. Also other slight changes in the construction of the invention may be resorted to without departing from the spirit or sacrificing any of the advantages thereof. Therefore, I do not wish to be limited to the structure herein shown and described except for such limitations as the claims may impart.

I claim:

1. A roller bearing comprising bearing rollers, spacing rollers, retaining means therefor, washers carried by said spacing rollers, said washers having reduced portions to form grooves to receive the retaining means.

2. A roller bearing comprising bearing rollers, spacing rollers, retaining means therefor, spindles formed on the spacing rollers, washers carried by the spindles, said washers having reduced portions to form grooves formed therein, said retaining means being arranged in the grooves of the washers.

3. A roller bearing comprising bearing rollers, spacing rollers, retaining means therefor, washers carried by the spacing rollers, said washers having reduced portions to form grooves to receive the retaining means, and a retaining ring for engagement in said grooves.

4. A roller bearing comprising bearing rollers, spacing rollers, retaining means therefor, disks carried by the bearing rollers, a housing, said retaining means having a flange formed thereon, said disks being adapted for engagement with said flange, and anti-friction means arranged between the disks and the bearing rollers.

5. A roller bearing comprising bearing rollers, spacing rollers, a housing therefor, retaining means for the rollers, washers carried by the spacing rollers, said washers having bosses formed thereon to provide grooves, said grooves being adapted to receive the retaining means, and a retaining ring for engagement in said grooves.

6. In an anti-friction roller bearing, a housing, a plurality of bearing rollers mounted therein, a retaining ring of L-shape in cross section arranged in spaced relation to the housing and accomodating the ends of the bearing rollers, a second retaining ring arranged in spaced relation to the first mentioned spacing ring, a plurality of spacing rollers arranged upon each side of the bearing rollers, and means upon the outer ends of the spacing rollers and movable circumferentially between the retaining rings to prevent longitudinal shifting of the spacing rollers.

7. In an anti-friction roller bearing, a housing, a plurality of bearing rollers mounted therein, a retaining ring of L-shape in cross section arranged in spaced relation to the housing and accommodating the ends of the bearing rollers, a second retaining ring arranged in spaced relation to the first mentioned spacing ring, a plurality of spacing rollers arranged upon each side of the bearing rollers, and spaced washers mounted upon the ends of the spacing rollers and movable circumferentially upon the retaining rings and engaging the inner and outer faces of the retaining rings.

In testimony whereof I affix my signature in presence of two witnesses.

GEORGE W. THOMAS.

Witnesses:
WM. PETERSON,
ERICK NELSON.

Copies of this patent may be obtained for five cents each, by addressing the "Commissioner of Patents, Washington, D. C."